July 8, 1924.  
F. G. B. RÖDEL  
BALL BEARING FOR SCREW GEARING  
Filed Dec. 6, 1923

1,500,270

Inventor:  
Friedrich G. B. Rödel.  
by Jones Addington Ames & Seibold

Witness:  
A. A. Brand

Patented July 8, 1924.

1,500,270

UNITED STATES PATENT OFFICE.

FRIEDRICH G. B. RÖDEL, OF LUTZEN, GERMANY.

BALL BEARING FOR SCREW GEARING.

Application filed December 6, 1923. Serial No. 678,839.

*To all whom it may concern:*

Be it known that I, FRIEDRICH G. B. RÖDEL, a citizen of the German Republic, residing at Oetzscher Weg No. 6, Lutzen, Germany, have invented new and useful Improvements Relating to Ball Bearings for Screw Gearing, of which the following is a full, clear, concise, and exact description, reference being had to the accompanying drawing, forming a part of this specification.

My invention relates to ball bearings for screw gearing, and it has particular relation to the provision of bearings for screw gearing wherein means are provided for insuring sufficient accuracy in order that said bearings may be used in connection with precision work.

A number of different types of ball bearings for screw gearing have been heretofore proposed, but all of these possess disadvantages in that they are not sufficiently accurate to permit them to be used for precision gearing, or precision work, this latter following because the nut which carries the balls cannot be adjusted, and by reason of the fact that the screw threads of the nut which are adapted to receive the balls cannot be ground.

In my proposed type of ball bearings for screw gearing, which is hereinafter described and claimed, this disadvantage is overcome, since every part of the bearing hereafter disclosed may be hardened and ground. Undue wear of the ball bearing by reason of the appreciable forces which are set up in the peculiar operation of the ball bearing for screw gearing, cannot, therefore, take place.

Figure 1:
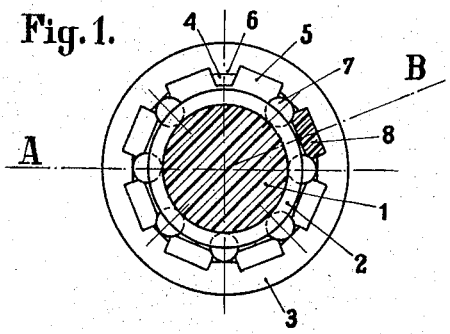
Figure 2:
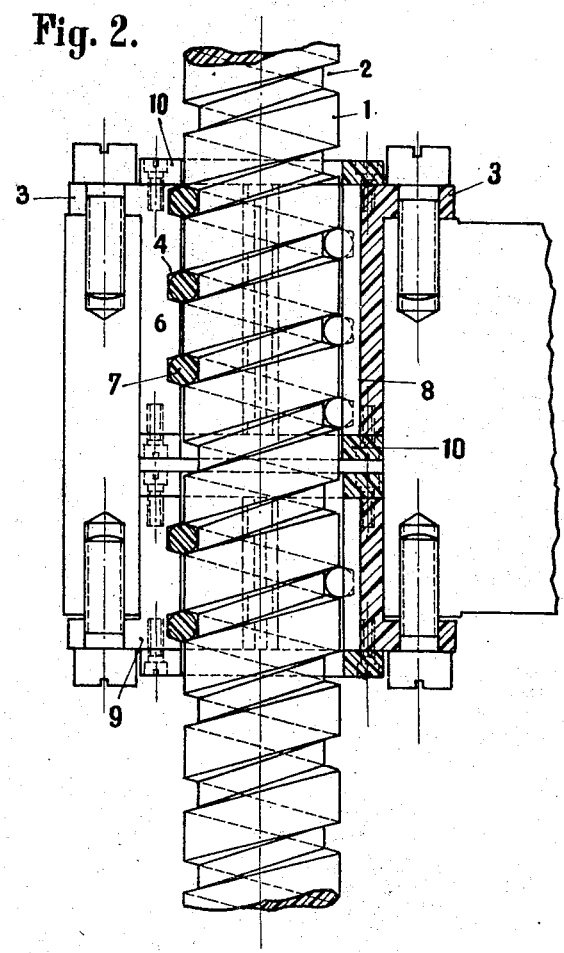

In the accompanying drawings:

Figure 1 is a plan view through one of my improved bearings, partially is section; and Fig. 2 is an elevational, sectional view taken on the line A—B of Fig. 1.

In the drawing, a shaft 1 is provided with a screw thread, for example, a trapezoidal thread 2, of which the movement is to be transmitted accurately by means of the ball bearing. A main casing 3 is provided which is in the form of a nut and is furnished with internal screw threads 4. The interior of the main casing 3 is provided with axially directed grooves 5.

Between the grooves are provided, above and below the screw threads 4, projections 6 which serve as seats or carriers for ball bearings 7. It will be apparent, therefore, that these balls 7 are partly seated in the screw thread 2 of the shaft, and partly in the screw thread 4 of the casing 3.

After the balls 7 have been introduced, wedges 8 are axially inserted into the groove 5 and serve thereby to confine the balls in position.

At both ends of the casing are arranged rings 10 which serve to hold the wedges 8 in place, the latter being arranged to be capable of adjustment, as shown in relation to the balls.

As shown in Fig. 2, a further bearing nut 9 is provided which serves as a counter nut for the main casing 3. This counter nut is so mounted on the structure in which the shaft is journalled that it may be adjusted with respect to the upper (Fig. 2) main casing 3, and I find that by means of my improved bearing it is possible to effect an adjustment of one thousandth of a millimeter in relation to the first nut, or casing 3.

While I have shown but one embodiment of my invention it is apparent that many modifications thereof may occur to those skilled in the art, which modifications may not differ patentably from the structure covered in the appended claims, and I desire, therefore, that my invention be interpreted broadly, and be limited only by the showing of the prior art and by the scope of the appended claims.

Having thus described my invention, what I now claim as new and desire to secure by Letters Patent of the United States is:

1. In a ball bearing for screw gearing, a threaded shaft, a threaded casing surrounding said shaft, ball bearings received in the threads of said shaft and said casing, and means confining said balls, said means comprising members insertable axially of said shaft.

2. In a ball bearing for screw gearing, a threaded shaft, an internally threaded casing, bearing balls seated partly in said shaft and partly in said casing, and axially insertable wedges positioned between said balls.

3. In a ball bearing for screw gearing, a threaded shaft, an internally threaded casing, bearing balls seated partly in said shaft and partly in said casing, axial grooves in said casing extending between the ball seats therein, and axially extending wedges inserted in said grooves and between said balls.

4. In a ball bearing for screw gearing, a threaded shaft, an internally threaded casing, bearing balls seated partly in said shaft threads and partly in said casing threads, axial grooves in said casing, wedge members seated in said grooves and extending between said balls, and means cooperating with said casing and said wedges for holding the latter in place and for adjusting the same.

5. In a ball bearing for screw gearing, a threaded shaft, an internally threaded casing, bearing balls seated partly in said shaft threads and partly in said casing threads, axial grooves in said casing, wedge members seated in said grooves and extending between said balls, and ring members associated with said casing for holding said wedges in place.

In witness whereof, I have hereunto subscribed my name.

FRIEDRICH G. B. RÖDEL